United States Patent [19]

Gale

[11] 4,064,077
[45] Dec. 20, 1977

[54] TOUGHENED ARTICLES COMPOSED OF LINEAR AROMATIC POLYMERS

[75] Inventor: David M. Gale, Wilmington, Del.

[73] Assignee: E. I. Du Pont de Nemours and Company, Wilmington, Del.

[21] Appl. No.: 730,517

[22] Filed: Oct. 7, 1976

Related U.S. Application Data

[62] Division of Ser. No. 389,989, Aug. 21, 1973, Pat. No. 4,011,293.

[51] Int. Cl.$^2$ .......................... C08G 61/10; C08J 5/00
[52] U.S. Cl. .............................. 260/2 H; 260/2.5 M; 264/126; 260/79.7
[58] Field of Search ................. 260/2 H, 2.5 M, 79.7; 264/126

[56] References Cited

U.S. PATENT DOCUMENTS

| | | | |
|---|---|---|---|
| 3,443,899 | 5/1969 | Accountius | 23/209.1 |
| 3,498,929 | 3/1970 | Accountius | 252/503 |
| 3,734,866 | 5/1973 | Aylies et al. | 260/2 R |
| 3,855,332 | 12/1974 | Wang | 260/670 |

Primary Examiner—Harold D. Anderson
Assistant Examiner—E. A. Nielsen

[57] ABSTRACT

Shaped articles composed of compacted polymeric particles wherein said polymer comprises substantially linear, aromatic polymer selected from the group consisting of aromatic hydrocarbon polymers, aromatic halocarbon polymers and aromatic halohydrocarbon polymers, consists essentially of substantially heteroatom-free aromatic linkages along the polymer backbone, is thermally stable at about 400° C as evidenced by decomposition temperatures above about 400° C, is infusible at the decomposition temperature, and is insoluble in conventional solvents are toughened by sintering said shaped article under a time-temperature cycle such that, when $T/T_{10}$ is plotted against t in the graph of the drawing, the point falls between the line representing the equation $$\log t + 34.5\ T/T_{10} = 34.5$$

and the line representing the equation $$\log t + 69\ T/T_{10} = 60$$

wherein $t$ is the sintering time in seconds, T is the sintering temperature in degrees Kelvin, and $T_{10}$ is the decomposition temperature of the polymer in degrees Kelvin.

5 Claims, 1 Drawing Figure

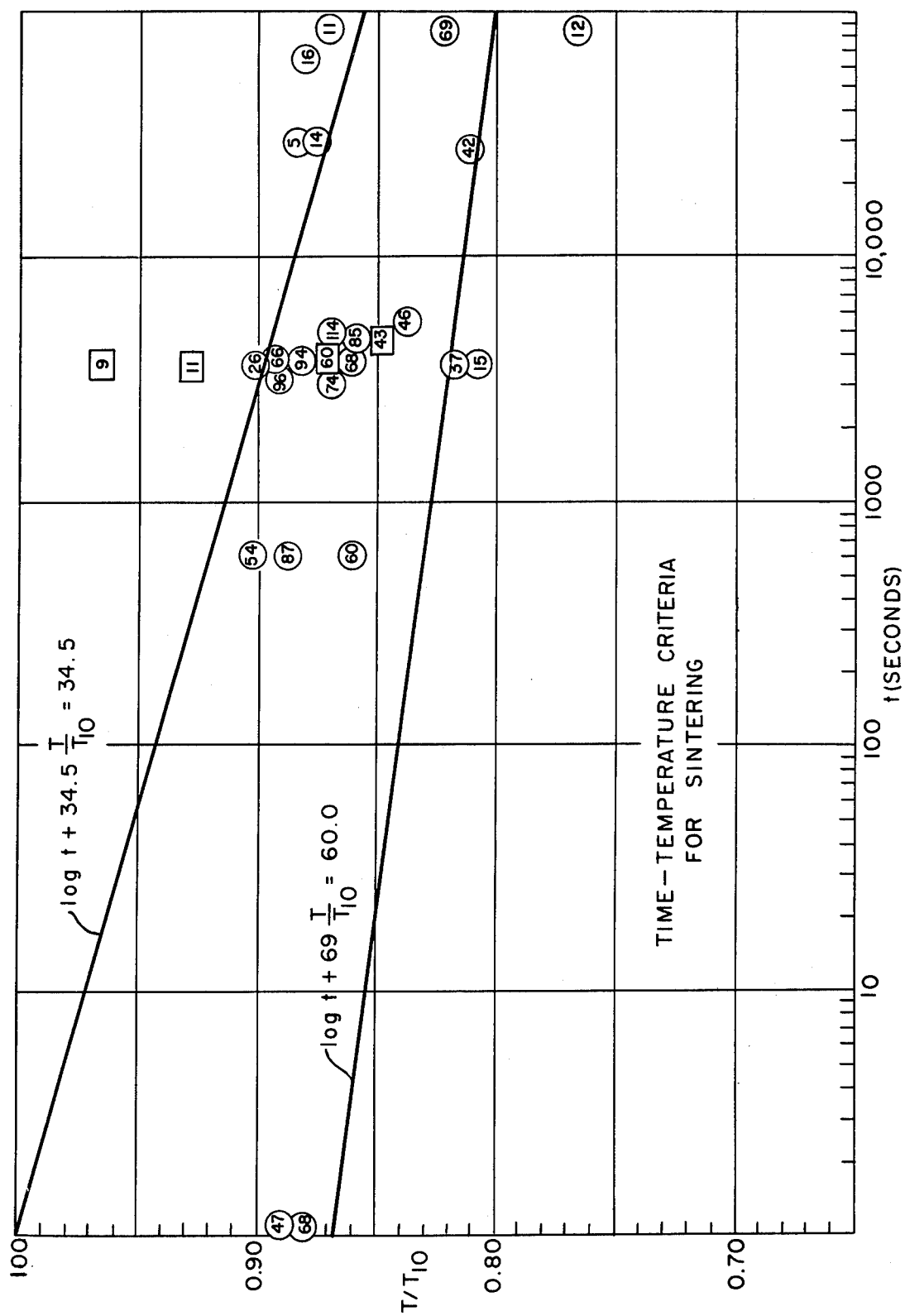

TOUGHENED ARTICLES COMPOSED OF LINEAR AROMATIC POLYMERS

CROSS REFERENCE TO RELATED APPLICATION

This is a division of application Ser. No. 389,989, filed Aug. 21, 1973, now U.S. Pat. No. 4,011,293, issued Mar. 8, 1977.

BACKGROUND OF THE INVENTION

1. Field of the Invention

This invention relates to a method of toughening shaped articles composed of compacted polymeric particles wherein said polymer is a thermally stable, intractable, substantially linear aromatic polymer and to the toughened shaped articles obtained thereby.

2. Description of the Prior Art

Polymers having predominatly aromatic character have long been recognized as offering a major advantage in thermal stability over the more conventional aliphatic polymers. Polymers of benzene, especially poly(p-phenylene) have been particularly attractive because of their unusual resistance to thermal decomposition and their potential low cost. A high-yield method for polymerizing benzene developed by Kovacic (e.g., see Kovacic and Kyriakis, Jour. Am. Chem. Soc., 85, p. 454, 1963) had led to intensive activity to develop a commercial high temperature polymer based on poly(p-phenylene).

The infusibility of pure poly(p-phenylene) and its insolubility in conventional organic solvents has heretofore prevented the utilization of its good high temperature properties in shaped articles. The powdered polymer obtained by the Kovacic procedure has been pressed into relatively weak articles that have some compressive strength. Using isostatic pressing, tensile strengths as high as about 2000 psi have been obtained (G. K. Ostrum, D. D. Lawson, and J. P. Ingham, Polymer Preprints, I (2), p. 895, 1966). Attempts have been made to reduce the brittleness of poly(p-phenylene) shaped articles by hot pressing and by annealing of pressed compacts. Kovacic et al. (Jour. Appl. Poly. Sci., 12, pp. 1735-1743, 1968) show that maximum strength is obtained by pressing near room temperature and that subsequent annealing at temperatures up to 500° C decreases fracture strength. The decrease in strength was found to correlate with increasing x-ray crystallinity and was attributed to brittleness that develops as amorphous polymer regions are crystallized. At 600° C all crystallinity was lost as the polymer began to degrade by loss of hydrogen.

The intractability of polybenzenes has diverted further development efforts in two opposite directions. On the one hand, the compressed, but weak, articles of polybenzene have served as precursors to high-strength carbonaceous articles obtained by pyrolysis at temperatures ranging from 650° to 2500° C. Molding of poly(p-phenylene) and subsequent pyrolysis are taught in British Pat. No. 1,156,041 and related U.S. Pat. Nos. 3,443,899 and 3,498,929. The yield of char can be maximized by using compositions with substantial chlorine content so that heating eliminates HCl to produce a cross-linked structure that is more resistant to loss of carbon at high temperatures (Vincent, Jour. Macromol. Sci. — Chem., A3(3), pp. 485-499, May 1969).

On the other hand, efforts have been made to chemically modify the desirable polyphenylene structure to reduce the rigidity of its polymeric backbone so that conventional forming techniques such as injection molding and solution casting can be applied. Modifications have included highly branched polyphenylenes, polymerization in the presence of oxygen and in nitroalkane solvents, the use of fused ring monomers which are taught in a series of patents to Bilow and coworkers (U.S. Pat. Nos. 3,555,108; 3,565,832; 3,578,611 and 3,582,498); and the use of nonaromatic linking groups such as amides as taught in Canadian Pat. No. 870,688. By their increased fusibility and solubility such polymers compromise the inherent advantages of the thermally stable aromatic compositions.

SUMMARY OF THE INVENTION

I have now discovered shaped articles having room temperature tensile toughness values greater than about 40, which comprise sintered, compacted polymeric particles wherein said polymer comprises substantially linear, aromatic polymer selected from the group consisting of aromatic hydrocarbon polymers, aromatic halocarbon polymers and aromatic halohydrocarbon polymers, consists essentially of substantially heteroatom-free aromatic linkages along the polymer backbone, is thermally stable at about 400° C as evidenced by a decomposition temperature above about 400° C, is infusible at the decomposition temperature, and is insoluble in conventional solvents. These articles are toughened by sintering under a time-temperature cycle such that, when $T/T_{10}$ is plotted against $t$ in the graph of the drawing, the point falls between the line representing the equation $$\log t + 34.5 \, T/T_{10} = 34.5$$

and the line representing the equation $$\log t + 69 \, T/T_{10} = 60$$

wherein $t$ is the sintering time in seconds, $T$ is the sintering temperature in degrees Kelvin, and $T_{10}$ is the decomposition temperature of the polymer in degrees Kelvin.

BRIEF DESCRIPTION OF THE DRAWING

FIG. 1 is a graph of sintering temperature, T, in ®K expressed as a fraction of the decomposition temperature, $T_{10}$, in ®K versus sintering time expressed in seconds on a logarithmic scale. Plotted on this graph are tensile toughness values corresponding to samples having the indicated time-temperature treatment.

BRIEF DESCRIPTION OF THE INVENTION

The shaped articles of this invention are composed of "substantially linear, aromatic polymers". Such polymers are those selected from the group consisting of aromatic hydrocarbons, aromatic halocarbons and aromatic halohydrocarbons. They are not highly branched, nor do they contain a substantial number of functional groups. The polymers of this invention consist essentially of carbon, hydrogen and halogen atoms. Other atoms can be present, but only in small amounts that will not interfere with the thermal stability of the polymers of this invention. BY "substantially heteroatom-free aromatic" it is meant that atoms other than carbon are not present in the aromatic rings in amounts which materially affect the basic characteristics of the products of this invention. In no case, should atoms other than carbon, hydrogen and halogen make up more than 10 atom percent of the elemental composition. The terms "polymer(s)" and "polymeric" are used broadly herein to include copolymers, terpolymers, etc., as well as homopolymers.

Thermal stability is maximized in simple, relatively unbranched structures that crystallize well. Thus, hydrocarbons are preferred to halocarbons. Highly branched polymers, which are outside the scope of this invention, have melting points or decomposition temperatures below 400° C., and generally will have more than two carbon atoms for each hydrogen and halogen atom. Of the hydrocarbons, those with C/H ratios between about 1.4 and 1.7, and especially poly(p-phenylene), are preferred.

The rigidity and thermal stability of aromatic polymers is derived from the aromatic character of the polymer backbone and is relatively independent of groups substituent to an aromatic chain. Thus, the invention includes polymers where an aromatic ring bears aliphatic substituents, as in

where R may be a lower alkyl group or an aryl group. The aromatic polymers used in accordance with this invention do not include polystyrene, polyphenylene oxide

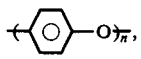

or aromatic polyamides or polyimides wherein the polymeric backbone comprises frequently interspersed nonaromatic moieties. By the term "consisting essentially of . . . aromatic linkages along the polymer backbone" it is meant that the amount of nonaromatic linkages in the backbone is insufficient to materially affect the basic characteristics of wholly aromatic polymers. It will be understood that occasional nonaromatic groups may inadvertently, or purposefully, be incorporated in the polymer chain, but no more than about 5% of the linkages along the polymer backbone should be nonaromatic in type, or else the desirable characteristics of the aromatic polymer will be sacrificed.

The following structures are given to illustrate the substantially linear, aromatic polymers coming within the compositional limitations given above:

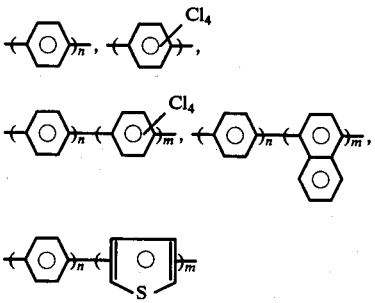

provided $\frac{m}{7m + 10n} \leq .1$, and

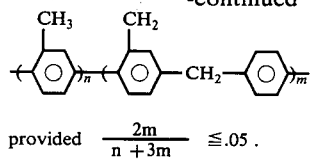

provided $\frac{2m}{n + 3m} \leq .05$.

The aromatic polymers used in accordance with this invention decompose without melting at a temperature above about 400° C. Polymers that decompose below 400° C. are not stable enough to meet the high temperature service requirements of this invention.

Methods of determining melting points and decomposition points are well known to those skilled in the art; for example, DTA and TGA analysis may be used to determine if a candidate polymer decomposes before it melts. Typically, the specimen is heated by these techniques at 6° C/min. in an inert atmosphere. If 10% weight loss occurs before melting, then the decomposition-before-melting requirement is met. Other similar criteria including, of course, direct visual judgment, can be employed as well. Obviously, the loss of volatile solvents or low molecular weight oligomers should not be considered in the total weight loss attributed to decomposition.

The aromatic polymer particles suitable for forming into the toughened articles of this invention may be conveniently prepared using the directions given by Kovacic and Oziomek, Macromolecular Syntheses, 2, pp. 23-24 (1966). With this procedure polymeric powders are generally obtained with a chlorine content below about 3.5%. The reaction should not be extended for more than a few hours after its initiation or after the evolved HCl has reached the stoichiometric amount given by the typical equation for poly(p-phenylene):

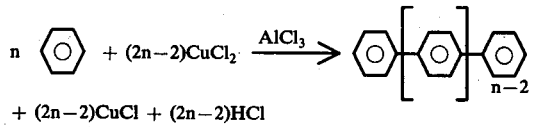

If the reaction is continued beyond this stage then further chlorination of the aromatic rings occurs and the chlorine content of the polymeric powder may become unacceptably high. Aromatic polymer powder with chlorine contents above about 3.5% generally do not toughen well on sintering. As the ratio of benzene to metal chlorides is increased using the AlCl$_3$/CuCl$_2$ procedure, two general trends are noted. First, the chlorine content of the powder increases. Secondly, the tensile strength of the formed article also increases. It has been found that powders in the 3 to 4% chlorine content range can be toughened if the powders are prepared by a high dilution process. Apparently the high dilution gives a better powder structure which can override some of the ill effects of the chlorine. Thus, shaped articles having tensile strengths of the order of about 4000 psi and exceptional toughness can be prepared with chlorine contents as high as 4%.

The use of CuCl$_2$ is preferred as an oxidizing agent in the presence of AlCl$_3$. Other oxidation systems such as FeCl$_3$/H$_2$O (described by Kovacic and Koch, Jour. Org. Chem., 28, p. 1864, 1963) may be used, but it is preferable in these cases to carry out the reaction in the presence of AlCl₃ in order to insure low chlorine content.

The difficulties with high chlorine content are believed to result from splitting out HCl from the aromatic ring upon heating. However, if on the other hand chlorine is present primarily in the form of perchlorinated rings, undesirable splitting out of HCl is avoided by the limitation on hydrogen and the polymers attain good toughness when heat-treated. Thus, tough polymeric compositions can be obtained by direct chlorination of poly(p-phenylene) as long as the chlorination is extensive enough that the hydrogen content is low enough to avoid subsequent splitting out of excessive HCl during heat treatment.

The polymerization reaction may be carried out with the liquid monomer serving as solvent or it may be carried out in an inert non-polar solvent such as cyclohexane by dropwise addition of the monomer.

Thorough washing of the polymerized powder with hydrochloric acid and finally distilled water is usually sufficient to remove inorganic salts. The powder is then dried and sintered. Additional puification steps are also feasible to remove low molecular weight impurities or to eliminate amounts of fines or powder lumps. Boiling with an organic solvent such as o-dichlorobenzene and preannealing at temperatures in the range of 100°–300° C are useful in removing unreacted monomer or low molecular weight polymer. If the chlorine content is not too high, i.e., less than about 3.5%, then a preannealing treatment may further lower the Cl content to within the desirable range of less than 2%, and further improve the response to subsequent sintering. Preannealing in an autoclave with aqueous ammonia or sodium hydroxide is particularly effective for this purpose. Sieving, gentle milling, and the same preannealing heat treatment are useful in obtaining powders that are free of surface impurities and dust and have a desirable surface area for compacting. Surface areas above about 10 m²/g and preferably above about 40 m²/g are preferred.

In order to form a shaped article the polymer particles must first be compacted in the form of the shaped article. The term "particle" as used herein is intended to cover polymer in any discrete form suitable for compaction into a shaped article. The actual size of the particles is not critical and will depend on the desired characteristics of the shaped article. The particles may be in a form obtained directly from the polymerization or may be obtained by suitable grinding of bulk polymer or particles of larger size.

The method of compaction used to shape the polymeric article before sintering may vary considerably. Compaction pressures in the general range of 10,000 to 100,000 psi may be used to obtain a "green bar" which on sintering in the propoer time-temperature range will toughen in accordance with this invention. Preferably, the shaped article is compacted at a pressure of 15,000 to 60,000 psi.

Pressing is normally done at room temperature with the final sintering, as well as intermediate annealing if desired, carried out without constraint, i.e., outside of the mold. Alternatively, where equipment is available, the polymer may be hot pressed, i.e., shaped and sintered under pressure in the mold within the critical range of sintering temperatures. The toughened articles of this invention may also be subjected to subsequent pressing operations as in a coining process. For maximum toughness a final sintering stage, as described below, should follow the last shaping operation.

For economy of heat, it is desirable to carry out a thermal treatment such as presintering anneal immediately prior to sintering rather than have two thermal treatments interspersed with a cooling step. Pre-sintering treatments at 250°–300° C. are preferred for times ranging from an hour to a day or more in an inert atmosphere.

The process for preparing the products of this invention has as an essential and novel step the sintering of a compacted shape in the critical temperature range between about 80% and 100% of its decomposition temperature in an inert atmosphere. Decomposition temperature is defined as the temperature, $T_{10}$, in ®K at which the polymer undergoes a 10% weight loss when heated in an inert atmosphere at the rate of 6° K per minute. The measurement of $T_{10}$ should be carried out under normal conditions used for TGA determinations in an apparatus designed for that purpose, such as in Ainsworth Semi-micro Thermobalance or a Du Pont Thermoanalyser. A reproducible value for $T_{10}$ will be obtained if the sample size (typically 0.05–0.10 g) and gas flow (about 25 ml/min of $N_2$) do not depart widely from customary values, and if the gas flow does not impinge directly on the sample.

Surprisingly, the temperature range at which sintering must occur has been found to be extremely critical if the improved tensile properties characterizing this invention are to be attained. Sintering even slightly below or slightly above the critical region produces little or no strengthening beyond the "green strength" of the pressed, but unsintered, article. As is to be expected, the time needed for effective stengthening depends somewhat upon the temperature within the critical region, and the limits of the critical temperature region are influenced by the time of heating.

It can be seen from the drawing that sharp discontinuities in tensile toughness characterize a critical band of the time-temperature conditions. The critical region of superior toughness may be defined by the solid lines which represent $\log t + 34.5\, T/T_{10} = 34.5$ (equation 1) and $\log t + 69\, (T/T_{10}) = 60.0$ (equation 2) wherein $t$ is the sintering time in seconds, T is the sintering temperature in degrees Kelvin, and $T_{10}$ is the decomposition temperature in degrees Kelvin. In other words, the sum in equation 1 must be no more than 34.5 and the sum in equation 2 must be at least 60 in order for the sintering conditions to be within the narrow range of this invention. These sintering conditions regularly produce tensile values substantially higher than does sintering outside the critical region. A preferred area exists within this region where the function $(T/T_{10})$ is not in excess of about 90. Processing in this area regularly yields tensile toughness values greater than about 50 and tensile strengths above about 3500 psi.

The critical time-temperature relationship applies despite considerable difference in the decomposition temperature. Thus, values for poly(p-phenylene) where $T_{10} = 993°$ K, denoted by circled numbers in the drawing, can be grouped with those from a perchlorinated poly(p-phenylene) wherein $T_{10} = 898°$ K, denoted by values within squares.

The samples plotted in the drawing represent sintering times from about 1 second to 24 hours. The indicated times are those measured from attainment of the selected temperature until heating was discontinued; they do not include cooling times within the critical temperature zone. In view of the need for maintaining a protective atmosphere at elevated temperatures, furnace cooling will normally provide the most convenient cooling method. When the sample is heated in the furnace and withdrawn to cool within an evacuated vessel, the cooling time within the sintering range will be an additional minute or more and the diagram of the drawing will serve as a practical guide to the selection of time and temperature. If a procedure of rapid quenching is employed, then some additional heating time, for example a few minutes or so, over that indicated by the drawing may be required.

The reasons underlying the indicated size and shape of the critical sintering region in the graph of the drawing are unknown; the indicated limits do offer a definite and practical guide to obtaining improved mechanical properties. Microscopic examination of fracture surfaces, particularly by scanning electron microscopy, indicates an increase in coalescence of the polymer particles within the arrow time-temperature range of this invention. However, increased toughness does not correlate well with X-ray crystallinity which is easily influenced by other optional processing conditions. Contrary to the teaching of the art, articles toughened by the process of this invention frequently show a higher degree of X-ray crystallinity after treatment.

Sintering should take place in vacuum or in an inert atmosphere; nitrogen, argon, helium, hydrogen, ammonia, methane and the like are operable as sintering gases. Air and oxygen should be excluded.

The expression "toughened" is meant to define articles that have been sintered to provide a tensile toughness value greater than about 40 when measured at room temperature. "Tensile toughness" is defined as the product of tensile strength and fractional elongation at break, measured in a conventional tensile test at room temperature. Aromatic polymers previously known to the art generally are very brittle; tensile specimens commonly break before the earliest strength measurement. Accordingly, mechanical testing and use conditions were frequently limited to compressive conditions. No articles of these polymers with tensile strengths significantly greater than 2000 psi have been reported, and elongations have not been reported much greater than 1%. Tensile toughness is regarded as a more general and inclusive criterion since sometimes elongation is sacrificed for tensile strength, or vice versa, under particular service conditions. The aromatic polymers known to the art generally give tensile toughness values less than 20, while the improved articles of this invention have tensile toughness values greater than 40. The preferred polymeric articles of this invention have tensile strengths greater than 3000 psi and in some cases greater than 4000 psi, and tensile toughness values greater than 50, and in some cases greater than 100.

Tensile properties are known to vary somewhat with the particular condition of the test employed. Thus, the values obtained from an ordinary tensile test will be affected by the method of measuring elongation and the rate of extension. The term "tensile toughness" as used throughout the specification and claims, is based on tensile strength (in psi) and percent elongation at break as determined by the standard test designated by the American Society for Testing Materials (ASTM) as method D-1708-59T, using speed B (0.05 in/min crosshead seed). This procedure utilizes small specimens which can readily be obtained from small quantities of polymer and directly measures elongation over the total distance between grips. If instead, an external extensometer is used to measure the elongation between selected points on the specimens, such changes in test procedure will yield lower values of tensile toughness. The correlation of results under various test conditions is commonly practiced by those familiar with physical test methods and may be employed here.

Shaped articles having good toughness can be formed from intractable, substantially linear aromatic polymers using the sintering technique of this invention. The term "shaped articles" is intended to include all those articles whose relatively fixed dimensions can be determined by compressive forming. This term includes useful shaped objects as well as articles which can be machined or otherwise further processed to form useful shaped objects. Included in the term are sheets and wires, as well as solid or hollow shapes having comparable dimensions in each direction. The articles can consist entirely of a homogeneous polymeric composition, a composite article such as a laminated polymeric sheet, or a filled polymeric composition.

The shaped articles of this invention may be prepared from aromatic polymer which is filled, extended or reinforced, or used to form laminates by the various techniques known in the art. Some of the more useful fillers and extenders are carbon-black, graphite, $MoS_2$, alumina, silica, clay, oil, glass, etc. Pigments such as $Fe_2O_3$, $TiO_2$, etc. may be used as fillers when it is desirable to alter the color of the objects. Reinforcing agents advantageously employed are glass fibers; synthetic fibers, e.g., Nomex® nylon, carbon fibers; acicular minerals, e.g., acicular rutile $TiO_2$; and the like. The shaped articles may also be painted or coated. Ordinary paints and coatings may be used to improve the appearance or surface properties of the shaped objects for use at ordinary temperatures.

The shaped articles of this invention possess the low coefficient of friction, good hardness, and excellent thermal stability that have been recognized as characteristic of the mechanically weak polyphenylenes known in the art. The improved toughness of the shaped articles of this invention suggests their use in applications requiring high temperature bearing surfaces that can tolerate higher stresses and a broader latitude of stress conditions. For example, the shaped articles of this invention are useful as high temperature bearings.

EXAMPLES OF THE INVENTION

The following examples, illustrating the novel toughening method and the novel toughened article of this invention, are given without any intention that the invention be limited thereto. All parts and percentages are by weight unless otherwise specified.

EXAMPLE 1

Poly(p-phenylene) powder was prepared as follows:

A 1-liter three-necked flask was fitted with a thermometer, a reflux condenser, a gas inlet tube, and a paddle stirrer. After the apparatus was swept with dry nitrogen, the gas flow was adjusted to a moderate rate.

While stirring was maintained, the flask was charged at 25° C. with 469 g (6 moles) of thiophene-free benzene, 200 g (1.5 moles) of anhydrous powdered aluminum chloride, and 101 g (0.75 mole) of dried, commercial anhydrous cupric chloride in the indicated order. The temperature was increased to 31°-32° C and held in this range. After an induction period of about 25 minutes, the reaction proceeded with good rapidity. During 2 hours, 0.64–0.65 mole (85–87%) of hydrogen chloride was evolved.

The dark viscous mixture was cooled at 15° C. and filtered through an 8.5-cm fritted glass filter. After being washed with benzene, the residue was carefully added with stirring to 1.4 liter of ice-cold 18% hydrochloric acid, and then heated at the boiling point of the mixture. The filtered solid was pulverized in the presence of water by means of a blender and triturated three times with a total of 4.2 liters of boiling 18% hydrochloric acid. Washing was effected by several triturations with 1.4 liters of boiling water and drying by storage overnight at 110° C. The yield of light brown product was 25–26 g. (89–91%).

The polymeric powder was compacted at room temperature under 80,000 psi pressure to form several "match stick" bars 1/10 inches × 1/10 inches × 3/2 inches. After being removed from the mold, one bar was placed in a small furnace with a flowing nitrogen atmosphere. The furnace was heated to 600° C., held for 1 hour and then allowed to cool while the nitrogen flow was maintained. The sintered sample showed a qualitative improvement in toughness over an unsintered bar compacted under the same conditions.

Another sample of poly(p-phenylene) powder prepared under identical circumstances was submitted for thermogravimetric analysis. When tested in an Ainsworth RV-AU-2 Semi-micro Thermobalance at a heating rate of 6° C. per minute in a nitrogen flow of 25 ml/min, this powdered sample began to lose weight at about 300° C. and reached a total weight loss of 10% at a temperature of 720° C. (993° K).

EXAMPLE 2

Benzene was polymerized by the method of Example 1, compacted into micro-tensile bars at room temperature under pressures around 74,000 psi. The cold-pressed bars were given the various presintering anneals and sintering treatments listed in Table I. The results in Table I and also in the graph of the drawing show a striking improvement in tensile toughness when sintering is carried out under conditions wherein the time-temperature factor is between the lines $\log t + 34.5\, T/T_{10} = 34.5$ (equation 1) and $\log t + 69\, T/T_{10} = 60$ (equation 2) in the drawing $T_{10}$ being 993° K for poly(p-phenylene). Samples A through G were not sintered according to this invention, and accordingly they do not have the tensile toughness which characterizes the products of this invention.

TABLE I

| | | | | | | | | | |
|---|---|---|---|---|---|---|---|---|---|
| | Direct-Forming of Poly(p-phenylene) | | | | | | | | |
| Sample No. | Elemental Analysis of Initial Powder | | | Presintering Anneal ° C/Time | Sintering Conditions ° C/Time | Tensile Strength, psi | % Elongation at Break | Toughness $T \times E \times 10^{-2}$ | Time-Temp. Factor, | |
| | %C | %H | %Cl | | | | | | Eq. 1 | Eq. 2 |
| 2 | 92.39 | 5.08 | 1.20 | 260°/3 days | 592°/30 min | 4276 | 1.67 | 70.6 | 33.3 | 63.3 |
| 3 | 90.87 | 5.03 | 2.33 | 285°/15 hr. | 600°/1 sec | 3389 | 2.00 | 67.5 | 30.3 | 60.6 |
| 4 | " | " | " | 280°/17 hr. | 600°/1 hr. | 3686 | 2.07 | 76.0 | 33.9 | 64.2 |
| 5 | " | 4.54 | " | 280°/17 hr. + 370°/3 days | 595°/1 hr. | 3834 | 1.87 | 72.0 | 33.8 | 64.0 |
| 6 | " | " | " | 275°/17 hr. | 530°/7 hr. | 3159 | 1.33 | 42.0 | 32.4 | 60.2 |
| 7 | " | " | " | 275°/17 hr. | 580°/1 hr. | 3375 | 1.47 | 49.3 | 33.2 | 62.9 |
| 8 | " | " | " | None | (added to oven at 610°, cooled to r.t.) | 3065 | 1.47 | 46.5 | 30.7 | 61.4 |
| 9 | " | " | " | None | 600°/1 hr. (under vac.) | 3725 | 1.40 | 52.5 | 33.9 | 64.2 |
| A | " | " | " | 275°/4 days | None | Too brittle to measure | | — | | |
| B | " | " | " | 280°/5 hr. | 600°/17 hr. | 1840 | 0.87 | 16.0 | 35.1 | 65.4 |
| C | " | " | " | None | 600°/24 hr. | 1061 | 0.47 | 5.0 | 35.2 | 65.5 |
| D | " | " | " | None | 600°/8 hr. (under vac.) | 1557 | 0.87 | 13.5 | 34.8 | 65.1 |
| 10 | 90.87 | 5.03 | 2.33 | 275°/17 hr. | 590°/1 hr. | 3787 | 1.67 | 66.3 | 33.6 | 63.6 |
| 11 | 91.66 | 5.15 | 2.00 | 275°/24 hr. | 580°/1.5 hr. | 3563 | 1.47 | 52.5 | 33.3 | 63.0 |
| 12 | " | " | " | 175°/24 hr. | 590°/3 hr. | 3598 | 1.53 | 55.0 | 34.0 | 64.0 |
| E | " | " | " | 260°/24 hr. | 669°/1 hr. | Too brittle to measure | | | 36.4 | 69.1 |
| 13 | 89.77 | 4.74 | 2.30 | 275°/17 hr. | 595°/1 hr. | 3697 | 1.67 | 61.5 | 33.7 | 63.9 |
| F | " | " | " | None | None | 2304 | 1.00 | 23.0 | — | — |
| 14 | 91.65 | 4.79 | 2.19 | 275°/17 hr. | 595°/1 hr. | 3799 | 1.60 | 60.7 | 33.7 | 63.9 |
| G | " | " | " | None | None | 2200 | 0.87 | 19.1 | — | — |
| 15 | — | — | 1.92 | 275°/17 hr. | 592°/1 hr. | 4093 | 1.87 | 76.5 | 33.7 | 63.7 |

EXAMPLE 3

Benzene was polymerized in several batches by the method of Example 1. In order to reduce the content of chloride salts the powders were autoclaved in concentrated aqueous ammonia at 300° C. for time ranging from 8-34 hours. Tensile test bars were molded from the treated powders under a pressure of 20,000 psi at room temperature. The bars were preheated overnight at 275° C. before sintering. For each of the samples shown in Table II, six replicates were sintered at the indicated conditions. Tensile tests were run on each using ASTM test method E8 employing an external extensometer. Table II shows the mean value among the replicates for the tensile strength and elongation measured in the E8 test. The tensile toughness equivalent to the ASTM, D-1708-59T test method is shown in the final column. It was obtained by multiplying the product of tensile strength and fractional elongation from the E8 test by the factor 1.62, determined by comparative tests on the same products. The tensile toughness results are also shown in the graph of the drawing for the appropriate time and temperature ($T/T_{10}$ where $T_{10} = 933°$ K) of sintering. It will be apparent that samples B and C, and particularly A, D and E, sintered outside the critical range of this process, do not have the high toughness which characterizes the products taught by this invention.

TABLE II
SINTERING OF POLY(p-PHENYLENE)

| Sample No. | Sintering Conditions °C | Time | Tensile Properties (E8 Test) Tensile Strength | Percent Elongation | Tensile Toughness (D1708) |
|---|---|---|---|---|---|
| 1 | 580 | 10 min | 3963 | 0.94 | 60.4 |
| 2 | 605 | " | 4588 | 1.17 | 87.0 |
| 3 | 620 | " | 4034 | 0.83 | 54.2 |
| 4 | 560 | 1.5 hrs | 3577 | 0.79 | 45.9 |
| 5 | 580 | 1 hr | 3951 | 1.06 | 67.9 |
| 6 | " | " | 4953 | 1.06 | 85.1 |
| 7 | 590 | " | 4271 | 1.06 | 73.5 |
| 8 | " | " | 5269 | 1.34 | 114 |
| 9 | 600 | " | 5100 | 1.13 | 93.5 |
| 10 | 606 | " | 4866 | 1.22 | 96.1 |
| 11 | 615 | " | 4069 | 1.00 | 66.0 |
| 12 | 540 | 24 hrs | 4159 | 1.02 | 68.9 |
| A | 530 | 1 hr | 2101 | 0.43 | 14.6 |
| B | 540 | " | 3061 | 0.75 | 37.1 |
| C | 620 | " | 3110 | 0.5 | 25.7 |
| D | 490 | 24 hrs | 1292 | 0.58 | 12.2 |
| E | 590 | " | 1508 | 0.45 | 11.0 |

EXAMPLE 4

A sample of poly(p-phenylene) prepared as in Example 1 was compacted at 40,000 psi at room temperature, heated at 275° for 3 days, and sintered at 585° C. for 1 hr. A bar thus direct-formed was coined (repressed) at 40,000 psi at room temperature, then heated to 590° C and annealed there (87% $T_{10}$) for 1.5 hr. The resultant bar had a tensile strength of 2,384 psi and elongation of 2.65% (toughness 63.1).

EXAMPLE 5

A sample of poly(p-phenylene) was prepared as in Example 1 and hot pressed in a graphite mold in three stages; 4,000 psi/room temperature/10 min, 4,000 psi/275° C./4 hr, and 4,000 psi/590° C./1 hr. A tough, smooth bar resulted with tensile properties: tensile strength, 3,197 psi; elongation, 2.10% (toughness 67).

Similar bars molded at 300° C. and 4410 psi for 2 min have toughness values no greater than 18.1.

EXAMPLE 6

Benzene was polymerized using a slight modification of the method used for the previous examples. The required quantities of $AlCl_3$ and $CuCl_2$ were charged into a vessel containing 273 ml of dry cyclohexane, but no benzene. Then 273 ml of benzene was added dropwise with stirring over a two-hour period at 31° C. After stirring for an additional hour at 31° C., 20.7 g. of polymer was isolated as a brown powder having a surface area of 66.8 m²/g. It was compacted at 74,000 psi into a tensile specimen, annealed at 275° C. for 17 hours, and sintered at 590° C. for 1 hr (both thermal treatments under $N_2$). Tested by ASTM D-1708-59T it had a toughness of 98.0 (tensile strength 5083 psi, 1.93% elongation at break).

EXAMPLE 7

A poly(p-phenylene) powder was prepared as in Example 1 and found to contain 1.08% Cl by analysis. The powder was heated in an autoclave with a 10% solution of NaOH for 8 hrs at 200° C. The Cl content was thereby reduced to 0.72%. A micro-tensile bar was hot pressed as in Example 4. The pressed bar had a tensile strength of 5,696 psi, and an elongation at break of 2.4% (tensile toughness 136).

Polyphenylene powders containing higher Cl contents (ranging from 4.7 to 10.2% Cl) were prepared by using $FeCl_3$ and $MoCl_5$ as oxidants for benzene according to the method of Kovacic and Koch, cited above, the Kovacic and Lange (Jour. Org. Chem. 28, p. 968, 1963). The bars were compacted at 74,000 psi and room temperature into micro-tensile specimens. Sintering within the time-temperature conditions described above (typically 550° C./0.5 hr) lowered the Cl content to a value of 0.12 to 0.18% in each case. Nevertheless, the sintered bars showed toughness values not greater than 18.

EXAMPLE 8

A mixture of 5 parts of poly(p-phenylene), prepared by the method of Example 1, 13 parts $AlCl_3$ and 45 parts $SnCl_4$ was treated with chlorine gas while being stirred. The brown powder was washed with concentrated HCl and then water before drying. Analysis showed 38.69%, C, 57.09% Cl, 0.60% H, indicating about 87% chlorination of the polymer. TGA analysis in nitrogen showed a $T_{10}$ temperature of 625° C. (898° K). A number of micro-tensile bars was pressed at 74,000 psi and their tensile properties determined after the thermal treatments indicated in Table III.

TABLE III
Direct Forming of Chlorinated Poly(p-phenylene)

| Sample No. | Pre-sintering anneal °C/hrs | Sintering °C/hrs | Tensile Strength, psi | % Elongation at break | Tensile Toughness, $T \times E \times 10^{-2}$ | Time-Temp. Factor Eq. 1 | Eq. 2 |
|---|---|---|---|---|---|---|---|
| 1 | 275/17 | 487/1.2 | 2823 | 1.60 | 45.2 | 32.7 | 62.0 |
| 2 | 275/17 | 487/1.2 | 2804 | 1.47 | 41.2 | 32.7 | 62.0 |
| 3 | 275/17 | 512/1 | 3442 | 1.72 | 59.6 | 33.7 | 63.9 |
| A | none | none | 1752 | 0.73 | 12.8 | — | — |
| B | none | none | 1333 | 0.53 | 7.1 | — | — |
| C | 275/17 | 560/1 | 1431 | 0.73 | 10.5 | 35.5 | 67.5 |
| D | 275/17 | 592/1 | 1279 | 0.73 | 9.3 | 36.7 | 70.0 |

The data given in Table III and in the drawing show that despite the high chlorine content and relatively lower decomposition temperature ($T_{10}$), mechanically tough shaped objects can be prepared from aromatic polyhalocarbons using the same sintering criteria that apply to the aromatic hydrocarbons.

EXAMPLE 9

Eighty-five parts of poly(p-phenylene) prepared as in Example 1 was mixed with fifteen parts of graphite (Dixon microfine grade). After wet mixing in water-ethanol suspension to insure homogeneity the powder was air-dried and compacted at room temperature under 60,000 psi pressure to form tensile specimens. The bars were sintered under nitrogen at 587° C ($T/T_{10}$ = 0.866) for 2 hours. When measured in the E-8 tensile test the bars showed a tensile strength of 5580 psi, an elongation of 0.89 and a modulus of 830 × 10³ psi. The composite combines the high modulus of graphite with the high tensile toughness attained by poly(p-phenylene) using the teachings of this invention.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property of privilege is claimed are defined as follows:

1. A shaped article having a room temperature tensile toughness value greater than 40 which comprises sintered, compacted polymeric particles wherein said particles comprise substantially linear, aromatic polymer selected from the group consisting of aromatic hydrocarbon polymers, aromatic halocarbon polymers and aromatic halohydrocarbon polymers, and said polymer consists of essentially of substantially heteroatom-free aromatic linkages along the polymer backbone, is thermally stable at 400° C as evidenced by a decomposition temperature about 400° C, is infusible at the decomposition temperature, and is insoluble in conventional solvents.

2. The article of claim 1 which has been toughened by sintering the compacted polymeric particles under a time-temperature cycle such that, when $T/T_{10}$ is plotted against $t$ in the graph of the drawing, the point falls between the lines representing the equation $$\log t + 34.5 \, T/T_{10} = 34.5$$

and the line representing the equation $$\log t \, 69 \, T/T_{10} = 60$$

wherein $t$ is the sintering time in seconds, $T$ is the sintering temperature in degrees Kelvin, and $T_{10}$ is the decomposition temperature of the polymer in degrees Kelvin.

3. The article of claim 2 in which the polymer has a carbon to hydrogen ratio between 1.4 and 1.7.

4. The article of claim 2 in which the polymer is poly(p-phenylene).

5. The article of claim 2 in which the polymer is chlorinated poly(p-phenylene).

* * * * *